(12) United States Patent
Ingvalson et al.

(10) Patent No.: US 10,502,573 B2
(45) Date of Patent: Dec. 10, 2019

(54) HEADING INCONSISTENCY MITIGATION FOR INERTIAL NAVIGATION USING LOW-PERFORMANCE INERTIAL MEASUREMENT UNITS WITH RELATIVE AIDING

(71) Applicant: Honeywell International Inc., Morris Plains, NJ (US)

(72) Inventors: Ryan Ingvalson, Loretto, MN (US); Michael Ray Elgersma, Plymouth, MN (US); Vibhor L Bageshwar, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 53 days.

(21) Appl. No.: 15/866,125

(22) Filed: Jan. 9, 2018

(65) Prior Publication Data

US 2018/0128618 A1    May 10, 2018

Related U.S. Application Data

(62) Division of application No. 15/174,207, filed on Jun. 6, 2016, now Pat. No. 9,909,877.

(51) Int. Cl.
*G01C 21/16* (2006.01)
*G01C 25/00* (2006.01)
*G01C 21/20* (2006.01)

(52) U.S. Cl.
CPC .......... *G01C 21/16* (2013.01); *G01C 25/005* (2013.01); *G01C 21/206* (2013.01)

(58) Field of Classification Search
CPC ..... G01C 21/16; G01C 25/005; G01C 21/206
(Continued)

(56) References Cited

U.S. PATENT DOCUMENTS 6,292,751 B1   9/2001  Frank
6,298,288 B1  10/2001  Li et al.
(Continued)

FOREIGN PATENT DOCUMENTS

CN      102628691 A    8/2012

OTHER PUBLICATIONS

European Patent Office, "Communication under Rule 71(3) from EP Application No. 17172909.8 dated Mar. 1, 2019", from Foreign Counterpart to U.S. Appl. No. 15/174,207, pp. 1-47, Published: EP.
(Continued)

*Primary Examiner* — Brian P Sweeney
(74) *Attorney, Agent, or Firm* — Fogg & Powers LLC

(57) ABSTRACT

A method of mitigating filter inconsistency of a heading estimate in an inertial navigation system is provided. The method includes inputting inertial measurements from at least one low-performance inertial measurement unit (IMU) in the inertial navigation system; inputting an initial-heading from at least one heading-information source; inputting an initial-heading uncertainty level associated with an error in the inputted initial-heading; initializing an initial-heading estimate with the inputted initial-heading; initializing an initial-heading uncertainty estimate with the inputted initial-heading uncertainty level; initializing an accumulated heading-change estimate to zero at a startup of the at least one low-performance IMU; and initializing an accumulated heading-change uncertainty estimate with an initial accumulated heading-change uncertainty level that is a value less than the inputted initial-heading uncertainty level; and periodically updating the accumulated heading-change estimate with the inertial measurements input from the at least one low-performance IMU.

5 Claims, 5 Drawing Sheets

(58) Field of Classification Search
USPC .................................................. 701/500
See application file for complete search history.

(56) References Cited

U.S. PATENT DOCUMENTS 8,457,891 B1 6/2013 Vallot et al.
2017/0350704 A1 12/2017 Ingvalson et al.

OTHER PUBLICATIONS

European Patent Office, "Extended European Search Report from EP Application No. 17172909.8 dated Nov. 7, 2017", from Foreign Counterpart to U.S. Appl. No. 15/174,207, pp. 1-9, Published: EP.
Goshen-Meskin et al., "Unified Approach to Inertial Navigation System Error Modeling", Journal of Guidance, Control, and Dynamics, May-Jun. 1992, pp. 1-6, vol. 15, No. 3, American Institute of Aeronautics and Astronautics, Inc.
U.S. Patent and Trademark Office, "Interview Summary", U.S. Appl. No. 15/174,207, dated Sep. 27, 2017, pp. 1-3, Published: US.
U.S. Patent and Trademark Office, "Supplemental Notice of Allowability", U.S. Appl. No. 15/174,207, dated Feb. 2, 2018, pp. 1-2, Published: US.
Benson,"A Comparison of Two Approaches to Pure-Inertial and Doppler-Inertial Error Analysis", "IEEE Transactions on Aerospace and Electronic Systems", Jul. 1, 1975, pp. 447-455, vol. AES-11, No. 4, Publisher: IEEE.
Durant-Whyte, "Introduction to Estimation and the Kalman Filter", "Introduction to Estimation (KC-1)", Jan. 2, 2001, pp. 1-129, Version 2.2, : Publisher: Hugh Durrant-Whyte 2000.
Hesch, "Consistency Analysis and Improvement of Vision-aided Inertial Navigation", "IEEE Transactions on Robotics", accepted Aug. 1, 2013, pp. 1-19, Publisher: IEEE.
Huang, "Towards Consistent Visual-Inertial Navigation", pp. 1-8, Published in: U.S.
Kasper, "Doppler Radar Error Equations for Damped Inertial Navigation System Analysis", "IEEE Transactions on Aerospace and Electronic Systems", Jul. 1, 1975, pp. 600-607, vol. AES-11, No. 4, Publisher: IEEE.
Savage, "Mitigating Second Order Error Effects in Linear Kalman Filters Using Adaptive Process and Measurement Noise", "www.strapdownassociates.com", May 16, 2014, pp. 1-27: Publisher: Strapdown Associates, Inc.
Savage, "Strapdown Analytics", Jan. 1, 2000, pp. 9, vol. 1, Publisher: Strapdown Associates, Inc.
Strapdown Associates, "Strapdown Associates, Inc. Website", "http://www.strapdownassociates.com/", retrieved Apr. 27, 2016, pp. 1-4, Published in: U.S.
Uhlmann, "Unscented Filtering and Nonlinear Estimation", "Proceedings of the IEEE", Mar. 1, 2004, pp. 101-422, vol. 92, No. 3, Publisher: IEEE.
United States Patent and Trademark Office, "Notice of Allowability", "from U.S. Appl. No. 15/174,207," dated Dec. 15, 2017, pp. 1-6, Published in: U.S.
United States Patent and Trademark Office, "Notice of Allowance", "from U.S. Appl. No. 15/174,207", dated Oct. 27, 2017, pp. 1-5, Published in: U.S.
United States Patent and Trademark Office, "Office Action" "from U.S. Appl. No. 15/174,207", dated Jul. 27, 2017, pp. 1-14, Published in: U.S.
United States Patent and Trademark Office, "Restriction Requirement", "from U.S. Appl. No. 15/174,207", dated Jun. 19, 2017, pp. 1-6, Published in: U.S.
Weinreb, "Comments on "The Psi-Angle Error Equation in Strapdown Inertial Navigation Systems"", "IEEE Transactions on Aerospace and Electronic Systems", Jan. 1, 1979, pp. 168-170, vol. AES-15, No. 1, Publisher: IEEE.
Weinred, "The Psi-Angle Error Equation in Strapdown Inertial Navigation Systems", "IEEE Transactions on Aerospace and Electronic Systems", May 1, 1978, pp. 539-542, vol. AES-14, No. 3, Publisher IEEE.
European Patent Office, "Extended European Search Report from EP Application No. 19167067.8 dated Jul. 15, 2019", from Foreign Counterpart to U.S. Appl. No. 15/174,207, pp. 1-9, Published: EP.

HEADING INCONSISTENCY MITIGATION FOR INERTIAL NAVIGATION USING LOW-PERFORMANCE INERTIAL MEASUREMENT UNITS WITH RELATIVE AIDING

CROSS-REFERENCE TO RELATED APPLICATIONS

This application is a divisional of U.S. patent application Ser. No. 15/174,207, filed Jun. 6, 2016, which is incorporated in its entirety herein by reference.

BACKGROUND

An inertial navigation system (INS) with a low-performance inertial measurement unit (IMU), which is only aided with relative aiding sensors, is susceptible to filter inconsistency for heading estimates. Relative aiding sensors are aiding sources that do not provide absolute navigation information. In a navigation system that uses measurements from a low-performance IMU, the heading error can grow quickly without absolute aiding sensors. The development of heading inconsistency is likely to occur when the navigation system does not have the sensing necessary to observe absolute heading.

An INS can generally observe absolute heading if either a high-quality IMU or an absolute aiding sensor are present. Absolute heading observability is available from a high-quality IMU, which provides the INS with gyrocompassing ability when the velocity of the INS with respect to Earth is known; e.g., this condition commonly occurs when the INS is stationary with respect to Earth, a zero-velocity condition. Alternately, absolute heading observability is available when absolute sensing (e.g., GPS position or GPS velocity) is coupled with appropriate trajectory kinematics, i.e. acceleration of the INS with respect to Earth, or when a calibrated magnetometer is coupled with sufficient horizontal magnitude of the earth's magnetic field.

A number of applications typically use a low-performance IMU which is only aided with relative aiding sensors. For example, simultaneous localization and mapping (SLAM) in robotic systems and personal navigation systems in denied environments, which have no access to GPS input, are two applications that are susceptible to heading inconsistency.

SUMMARY

The present application relates to a method of mitigating filter inconsistency of a heading estimate in an inertial navigation system. The method includes inputting inertial measurements from at least one low-performance inertial measurement unit (IMU) in the inertial navigation system; inputting an initial-heading from at least one heading-information source; inputting an initial-heading uncertainty level associated with an error in the inputted initial-heading; initializing an initial-heading estimate with the inputted initial-heading; initializing an initial-heading uncertainty estimate with the inputted initial-heading uncertainty level; initializing an accumulated heading-change estimate to zero at a startup of the at least one low-performance IMU; initializing an accumulated heading-change uncertainty estimate with an initial accumulated heading-change uncertainty level that is a value less than the inputted initial-heading uncertainty level; periodically updating the accumulated heading-change estimate with the inertial measurements input from the at least one low-performance IMU; inputting at least one relative aiding measurement from at least one relative aiding sensor; and updating the navigation filter with the relative aiding measurement inputted from at least one relative aiding sensor.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
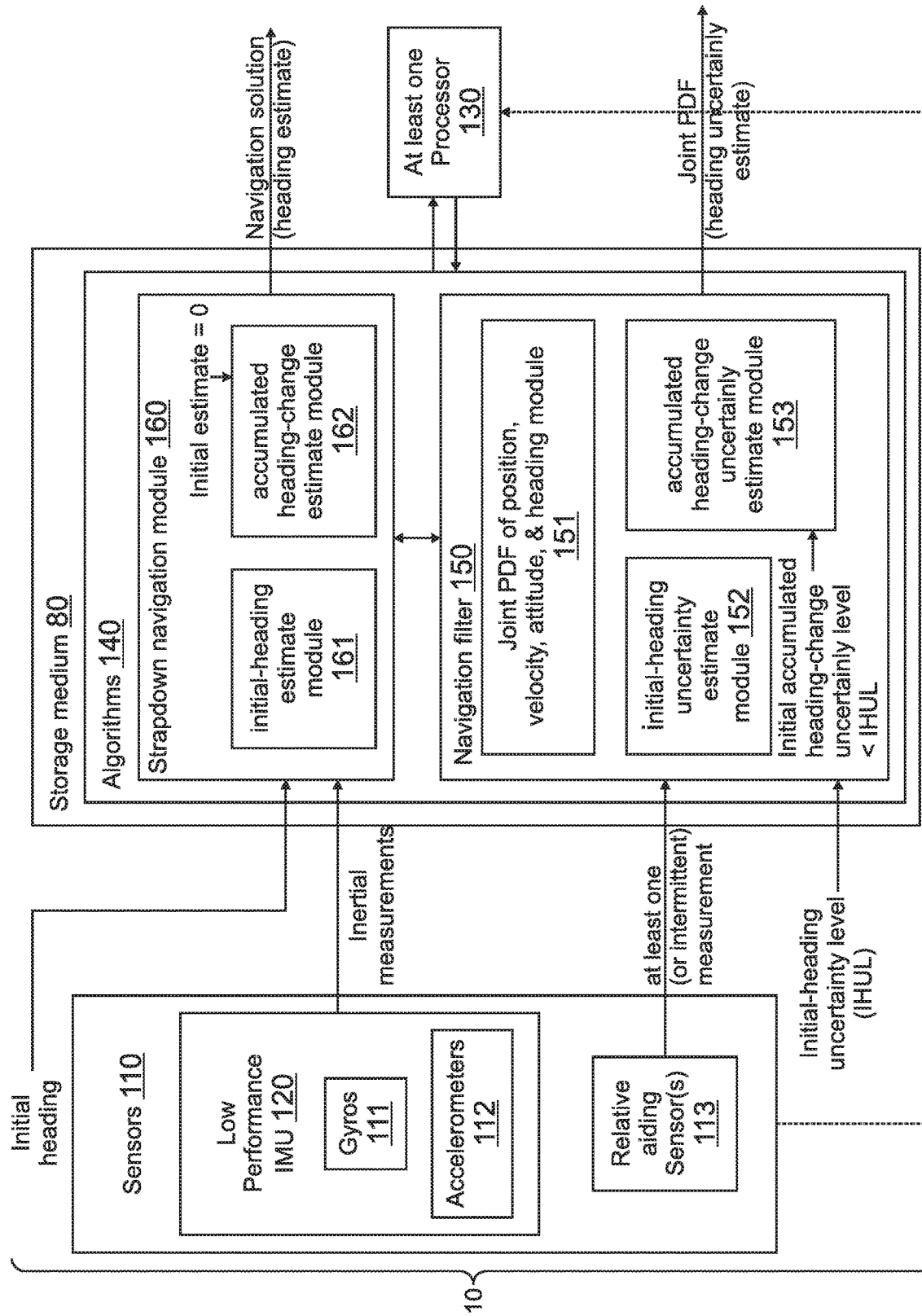
FIG. 1 shows a navigation system including at least one low-performance IMU sensor and relative aiding sensors, such a system may exhibit heading inconsistency without the appropriate filter structure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Relative aiding sensors are unable to independently register themselves in inertial space. Examples of relative sensing (with example sensors) are: Velocity sensing (Doppler radar); acceleration sensing (accelerometer); angular rate sensing (low-performance gyroscope, or gyro); three dimensional (3D) attitude change sensing (camera); and position change sensing (camera).

An inconsistent filter has an optimistic view of the actual errors in the INS and over estimates the state covariance matrix (i.e., the estimated uncertainty, or variance, is smaller than the actual uncertainty). For a filter applied to a nonlinear stochastic system, the estimated variance does not imply anything about the size of the estimated mean errors. It only implies that the state mean vector estimated by the filter has converged. It is critical for a filter to estimate an accurate and consistent representation of the statistics of the state vector. The main problems of filter inconsistency are: filter divergence; and rejection of useable measurements leading to low performance. Divergence is the condition of a filter, in which errors have caused the filter to become so unstable that recovery is not possible. More precisely, this condition is characterized by an unbounded state mean vector error, and a state covariance matrix that grows unbounded. The rejection of useable measurements is caused by the filter's estimate of the state covariance matrix being smaller than it should be. This means the aiding sensor measurements may not appear reasonable to the filter, and these measurements may be viewed as outliers and rejected by the filter. Rejection of useable measurements will lead to lower navigation system performance. Depending upon the system and/or mission requirements, the lower performance may be unacceptable. Prolonged rejection of good measurements may also lead to filter divergence.

The embodiments of the repartitioned model described below mitigate the problem of filter inconsistency in heading estimation for INS with relative aiding. The technology described herein relies on a repartitioning of the heading error to different states within the models while taking advantage of existing strapdown INS error equations. As used herein, the term "repartition" indicates a revised method of partitioning (over the prior art) of the heading error. This revised type of partitioning (repartitioning) reduces or eliminates divergence between a predicted uncertainty and an actual uncertainty over time for an INS in which a low-performance IMU is only aided with relative aiding sensors. The effectiveness of this revised type of partitioning (repartitioning) is shown and described below with reference to FIGS. 3 and 4.

As an example, in a classical (prior art) local-vertical INS mechanization, the initial-heading estimate is used in the initialization of the Body-to-Local-Vertical Frame transformation. This results in the initial-heading error being fully allocated to the classical gamma (γ) angle, as it is commonly known. In the repartitioned model, the initial-heading estimate is, instead, used to initialize the Earth-to-Local-Vertical transformation. This choice allows the classical epsilon angle (ε) to fully account for the initial-heading error, while all of the accumulated 3D attitude error due to the integration of the gyro data is fully accounted for in the gamma angle. This approach allows complete decoupling of the initial-heading error from the relative aiding measurement without the reliance on an analytical cancellation. This analytical cancellation, as described in section VI of Kasper, J. F.; Nash, R. A., "*Doppler Radar Error Equations for Damped Inertial Navigation System Analysis*", Aerospace and Electronic Systems, IEEE Transactions, Vol. 11, No. 4, pp. 600-607, July 1975, relies on perfect state estimation. Perfect state estimation is impossible especially in real-time implementations due to model inaccuracies, measurement errors, and measurement noise. Rather than rely on an ideal mathematical cancellation, which cannot occur, the technology described herein proposes a change of state-space coordinates, i.e. a repartitioning of the state space.

This decoupling mitigates filter inconsistency for heading estimates in INS, or heading inconsistency, with low-performance IMUs with relative aiding and infrequent absolute aiding so that the heading inconsistency in an INS described herein is less than the heading inconsistency in a prior art INS. In this manner, an INS generates a heading estimate that is more consistent over time and deviates less over time from the actual heading.

The mathematical background used for the repartitioned model technology is presented along with the discussion of the system and method of the repartitioned model technology with reference to the drawings.

The use of bold symbols, e.g., x, refers to vectors and matrices, whereas scalars are written with standard font symbols. The following definitions used in this document are direction cosine matrices (DCMs) based on single-axis Euler rotations, one for each of the 3 principal axes.

$$M_1(\theta) \triangleq \begin{bmatrix} 1 & 0 & 0 \\ 0 & \cos\theta & \sin\theta \\ 0 & -\sin\theta & \cos\theta \end{bmatrix} \quad \text{Equation (1)}$$

$$M_2(\theta) \triangleq \begin{bmatrix} \cos\theta & 0 & -\sin\theta \\ 0 & 1 & 0 \\ \sin\theta & 0 & \cos\theta \end{bmatrix} \quad \text{Equation (2)}$$

$$M_3(\theta) \triangleq \begin{bmatrix} \cos\theta & \sin\theta & 0 \\ -\sin\theta & \cos\theta & 0 \\ 0 & 0 & 1 \end{bmatrix} \quad \text{Equation (3)}$$

Equation (1) is a 1-axis Euler rotation. Equation (2) is a 2-axis Euler rotation. Equation (3) is a 3-axis Euler rotation. Note that $M_i^T(\theta) = M_i(-\theta)$.

Small-Angle Attitude Misalignment

An estimated DCM is defined as:

$$\hat{C} \triangleq \tilde{C}C \text{ or } \hat{C} \triangleq C\tilde{C}, \quad \text{Equation (4)}$$

where $\tilde{C}$ is a DCM rotation that corrupts the estimate of C. Next, if $\tilde{C}$ refers to a first-order approximation for a DCM corresponding to small-angle rotation then:

$$\tilde{C} \approx I - \{\delta\theta\} \quad \text{Equation (5)}$$

where $\{\bullet\}$ is defined such that $\{a\}$ refers to the skew symmetric matrix corresponding to vector a.

If equation (5) is substituted into the expressions for $\hat{C}$ in equation (4), equation (4) becomes:

$$\hat{C} - C \approx -\{\delta\theta\}C \text{ or } \hat{C} - C \approx -C\{\delta\theta\} \quad \text{Equation (6)}$$

Next, if we define $\delta C = \hat{C} - C$, then equation (6) is rewritten as:

$$\delta C \approx -\{\delta\theta\}C \text{ or } \delta C \approx -C\{\delta\theta\} \quad \text{Equation (7)}$$

In equations (4), (6), and (7) the expressions to the left of the "or" represent small-angle attitude misalignments that postmultiply the true DCM (i.e., $\tilde{C}$ post-multiplies C in equation (4)), whereas the right hand expressions represent small-angle attitude misalignments that pre-multiply the true DCMs (i.e., $\tilde{C}$ pre-multiplies C in equation (4)).

Repartitioning the Heading State

The technology described herein keeps track of the total heading error by defining two separate heading error states in a model referred to as the repartitioned model. The repartitioned model presented herein treats the heading error as two errors to be estimated separately. Specifically, the heading (also referred to herein as heading state) is partitioned as an initial-heading and an accumulated heading-change. The repartitioned model has two main or key features, which when satisfied, mitigate filter inconsistency for heading estimation in an INS with low-performance IMUs with relative aiding and infrequent absolute aiding. These two key features are: 1) estimating the heading error with two independent and distinct states: one for the error in the initial-heading and one for the error in the accumulated heading-change since the INS startup; and 2) ensuring the heading error states directly correspond to navigation quantities explicitly computed in the INS. In this embodiment, the navigation quantities explicitly computed in this embodiment are those quantities computed as shown in equation (25) (the solution for $C_{LV}^E$) and equation (26) (the solution for $C_B^{LV}$). The term "navigation quantities explicitly computed" is also referred to herein as "at least one computed navigation quantity". The navigation quantities explicitly computed include position, velocity, attitude, and heading.

As a point of clarification, the term "attitude" will refer to the pitch and roll of the navigation system's body-frame with respect to Earth. In a more general context, the orientation of one reference frame with respect to another frame is defined by three angles and may be referred to as "attitude". But in this context for clarity, the orientation of one reference frame to another will be referred to as the "3D attitude", or orientation.

In this embodiment, in reference to the first feature, the classical phi-error model for strapdown navigation systems will be used. In this model, a 3D attitude error vector ($\epsilon$) is assigned to the $C_{LV}^E$ DCM and an independent error vector ($\gamma$) is assigned to the $C_B^{LV}$ DCM. In reference to first and second features, putting the initial-heading estimate (i.e., initial-heading angle) in the initial wander angle satisfies both of these feature. As it will be shown later, this assigns the error in the initial heading estimate to the $\epsilon$ error vector, and the error in the accumulated heading-change to the $\gamma$ error vector, which satisfies the first feature. Lastly, since these error vectors are directly associated with navigation parameters computed by the INS—i.e., $C_{LV}^E$ and $C_B^{LV}$—the second feature is satisfied as well. This technology advantageously reduces filter inconsistency in heading estimation for INS with relative aiding over prior art error partitioning models.

Earth-to-Body DCM: The Basic Form

In its most basic form, the earth-to-body DCM is typically defined by five angles: latitude $\lambda$, longitude $\Lambda$, heading $\psi$, pitch $\theta$, and roll $\phi$. These angles define the earth-to-body DCM according to the following:

$$C_E^B \triangleq M_1(\phi)M_2(\theta)M_3(\psi)M_2\left(-\lambda-\frac{\pi}{2}\right)M_3(\Lambda) \quad \text{Equation (8)}$$

This definition assumes the E-frame is the Earth Centered Earth Fixed (ECEF) frame. The frame arrived at after the $$\left(-\lambda-\frac{\pi}{2}\right)$$

rotation is the NED frame (i.e., a frame with the x-axis aligned with North, the y-axis aligned with East, and the z-axis aligned with the geodetic Down). Using the NED-frame, equation (8) can be written as:

$$C_E^B = C_{NED}^B C_E^{NED} \quad \text{Equation (9)}$$

where:

$$C_E^{NED} = M_2\left(-\lambda-\frac{\pi}{2}\right)M_3(\Lambda) \quad \text{Equation (10)}$$

$$C_{NED}^B = M_1(\phi)M_2(\theta)M_3(\psi) \quad \text{Equation (11)}$$

In this context, the NED frame is an intermediate frame and it is a local-vertical frame. A local-vertical frame is a frame whose origin follows the center of the navigation solution (i.e., "local") and whose z-axis is parallel to the geodetic vertical axis (i.e., "vertical").

Earth-to-Body DCM: The Wander Angle Form

Even though the earth-to-body DCM is fully defined with the above definitions, for navigation purposes, an additional angle may be added. The additional angle is called the wander angle and it defines an intermediate local-vertical frame which is slightly different than the NED frame. In the context herein, this local-vertical frame is referred to as the wander-NED frame and is different from the NED frame by an additional positive rotation $\alpha$ about the z-axis of the NED frame. The angle $\alpha$ is the wander angle. For the remainder of this discussion, the wander-NED frame is the primary local-vertical frame of interest, and it is denoted as the LV-frame.

With the wander angle included, the earth-to-body DCM is now defined as follows:

$$C_E^B \triangleq C_{LV}^B C_E^{LV} \quad \text{Equation (12)}$$

where:

$$C_E^{LV} = M_3(\alpha)M_2\left(-\lambda-\frac{\pi}{2}\right)M_3(\Lambda) \quad \text{Equation (13)}$$

$$C_{LV}^B = M_1(\phi)M_2(\theta)M_3(\psi^c) \quad \text{Equation (14)}$$

Then inserting the definitions of $C_E^{LV}$ and $C_{LV}^B$ shown in equations (13) and (14) into the definition of $C_E^B$ in equation (12) results in:

$$C_E^B \triangleq M_1(\phi)M_2(\theta)M_3(\psi^c)M_3(\alpha)M_2\left(-\lambda-\frac{\pi}{2}\right)M_3(\Lambda) \quad \text{Equation (15)}$$
$$= M_1(\phi)M_2(\theta)M_3(\psi^c+\alpha)M_2\left(-\lambda-\frac{\pi}{2}\right)M_3(\Lambda)$$

Equations (14) and (15) includes a new symbol $\psi^c$. This symbol is added to compensate for the effect of the wander angle which is a rotation about the same axis as the true heading angle. By comparing equation (15) for $C_E^B$ with equation (8) for $C_E^B$, it is apparent that:

$$\psi = \psi^c + \alpha \quad \text{Equation (16)}$$

To clarify, $\psi$ refers to the true heading, i.e., the angle of the B-frame x-axis with respect to true North. This is seen by inspection of equation (8) for $C_E^B$. Similarly, the angle $\psi^c$ is the angle that the x-axis of the B-frame is rotated away from the LV-frame x-axis. Since the LV-frame x-axis does not necessarily align with true North, the $\psi^c$ angle does not represent the true heading and will be referred to as the computational heading angle to distinguish it from the true heading. As equation (16) shows, the true heading is the sum of the computational heading and the wander angle.

Earth-to-Body Initialization

Independent of the definition of the earth-to-body DCM, the true heading, at any given time, may be interpreted as the sum of two parts: the initial true heading $\Psi_0$ and the accumulated heading-change $\Delta\psi$, which is mathematically represented as:

$$\psi(t) \triangleq \Psi_0 + \Delta\psi(t) \quad \text{Equation (17)}$$

$\Psi_0$ does not have a time argument; since it is independent of time, it is a single constant value. Since, by definition, the initial value of the accumulated heading-change is zero, the initial true heading is fully defined by the parameter $\Psi_0$. The initial true heading, i.e., the true heading at time zero, is mathematically represented as:

$$\psi(0) = \Psi_0 \quad \text{Equation (18)}$$

This means that $\hat{\psi}(0)$ (the "initial estimate of true heading") and $\hat{\Psi}_0$ (the "initial-heading estimate") are synonymous, as implied by equation (18).

However, in the navigation system being discussed, the attitude and heading are maintained by two DCMs $C_{LV}{}^B$ and $C_E{}^{LV}$, neither of which are explicitly defined with the true heading $\psi$. Instead, they are defined by the components related to the true heading: $\psi^c$ and $\alpha$. The initialization of $C_{LV}{}^B$ and $C_E{}^{LV}$ are also written in terms of those parameters: $\psi^c$ and $\alpha$. As shown in equation (16), the true heading may be written (with a time argument t) as:

$$\psi(t)=\psi^c(t)+\alpha(t) \quad \text{Equation (19)}$$

Given the definitions $\psi_0{}^c \triangleq \psi^c(0)$ and $\alpha_0 \triangleq \alpha(0)$, equating equation (19) with equation (18) gives:

$$\Psi_0=\psi_0{}^c+\alpha_0 \quad \text{Equation (20)}$$

Since estimates for both $\psi_0{}^c$ and $\alpha_0$ are required to initialize the navigation matrices $C_E{}^{LV}$ and $C_{LV}{}^B$, equation (20) is a key relationship since it determines how the initial-heading estimate may be allocated to one (or both) of these parameters. Prior art navigation systems that utilize a wander-NED frame allocate the initial-heading estimate, $\hat{\Psi}_0$, as follows:

$$\psi_0{}^c \leftarrow \hat{\Psi}_0 \quad \text{Equation (21)}$$

$$\alpha_0 \leftarrow 0 \quad \text{Equation (22)}$$

But in the repartitioned the navigation system model described herein, the initialization is:

$$\psi_0{}^c \leftarrow 0 \quad \text{Equation (23)}$$

$$\alpha_0 \leftarrow \hat{\Psi}_0 \quad \text{Equation (24)}$$

Equations (23) and (24) define the modified heading initialization approach for the repartitioned model, and allow the separation of the initial-heading error from the accumulated heading-change error to be clearly seen, which is in accordance with the two key features of the repartitioned model described above as will be shown next. The initial computational heading is set to zero because this variable ultimately represents the initial accumulated heading-change portion of the initial true heading in the repartitioned model; and, by definition, the initial value of the initial accumulated heading-change is zero.

In LV-frame based strapdown navigation systems, the gyro measurements are integrated directly into the $C_B{}^{LV}$ matrix. Since the gyros measure the heading-change, the accumulated heading-change error is associated with the $C_B{}^{LV}$ matrix. Due to the repartitioned model heading initialization defined in Equations (23) and (24), the initial-heading error is associated with the $C_E{}^{LV}$ matrix, and not the $C_B{}^{LV}$ matrix. This partially fulfills the key features of the repartitioned model by separating where the two sources of heading error are allocated. In the traditional (prior art) model, both the initial-heading error (i.e., the error in the parameter $\hat{\Psi}_0$) and the accumulated heading-change error (i.e., the error from the gyro measurements) are associated with the $C_B{}^{LV}$ matrix. With the modified initialization approach described herein, the initial-heading error (i.e., the error in the parameter $\hat{\Psi}_0$) is associated solely with the $C_E{}^{LV}$ matrix, and the accumulated heading-change error (i.e., the error from the gyro measurements) is solely associated with the $C_B{}^{LV}$ matrix. Then, as the long as the errors in $C_E{}^{LV}$ and $C_B{}^{LV}$ are estimated separately by the navigation filter design, the first feature (i.e., estimating the heading error with two independent and distinct states: one for the error in the initial-heading and one for the error in the accumulated heading-change since initialization) of the repartitioned model is satisfied. The second feature (i.e., ensuring the heading error states directly correspond to navigation quantities explicitly computed in the INS) of the repartitioned model will also be satisfied as long as the navigation quantities $C_E{}^{LV}$ and $C_B{}^{LV}$ are explicitly computed by the INS, which is the case in this exemplary embodiment.

The full initialization of the navigation DCMs is summarized as follows. The initialization of $C_E{}^{LV}$ and $C_B{}^{LV}$ is written in terms of the initial angle parameters:

$$(C_E^{LV})_0 \triangleq M_3(\alpha_0)M_2\left(-\lambda_0-\frac{\pi}{2}\right)M_3(\Lambda_0) \quad \text{Equation (25)}$$

$$(C_{LV}^B)_0 \triangleq M_1(\phi_0)M_2(\theta_0)M_3(\psi_0^c) \quad \text{Equation (26)}$$

where:

$$(C_E^B)_0=(C_{LV}^B)_0(C_E^{LV})_0 \quad \text{Equation (27)}$$

The initial angles are:
$\alpha_0 \leftarrow$ initial wander angle
$\lambda_0 \leftarrow$ initial latitude
$\Lambda_0 \leftarrow$ initial longitude
$\phi_0 \leftarrow$ initial roll
$\theta_0 \leftarrow$ initial pitch
$\psi_0{}^c \leftarrow$ initial computational heading Table 1 summarizes the differences in how the initial angle estimates are used to initialize the navigation DCMs for a wander-NED implementation. It compares the initialization for the existing traditional prior art model and the repartitioned model disclosed herein.

TABLE 1

| | Prior Art Model | Repartitioned Model |
|---|---|---|
| Angles Used to Initialize $C_E{}^{LV}$ | $\alpha_0 = 0$<br>$\lambda_0 = \hat{\lambda}_0$<br>$\Lambda_0 = \hat{\Lambda}_0$ | $\alpha_0 = \hat{\Psi}_0$<br>$\lambda_0 = \hat{\lambda}_0$<br>$\Lambda_0 = \hat{\Lambda}_0$ |
| Angles Used to Initialize $C_{LV}{}^B$ | $\phi_0 = \hat{\phi}_0$<br>$\theta_0 = \hat{\theta}_0$<br>$\psi_0{}^c = \hat{\Psi}_0$ | $\phi_0 = \hat{\phi}_0$<br>$\theta_0 = \hat{\theta}_0$<br>$\psi_0{}^c = 0$ |

Navigation Overview

The primary concern of the repartitioned model is the allocation of the heading error. The primary concern is not with the computation of the whole-value navigation parameters (i.e. the propagation kinematics of the navigation parameters) as long as the two key features of this invention are satisfied. As will be shown next, the two key features of this invention are satisfied when the classical phi-error model (i.e. one containing both $\epsilon$ and $\gamma$ error vectors) is used in combination with standard 3D attitude propagation kinematics and with the repartitioned model initialization of the navigation DCMs, as shown in Table 1.

Propagation Kinematics

The total 3D attitude is generally defined as the rotation from the body-frame (B) to the earth-frame (E). In addition, this rotation is defined via an intermediate frame, the local-vertical-frame (LV) as described earlier. The total transformation written with the intermediate LV-frame is:

$$C_B^E=C_{LV}^E C_B^{LV} \quad \text{Equation (28)}$$

The standard 3D attitude kinematics of $C_{LV}^E$ and $C_B^{LV}$ are the following:

$$\dot{C}_{LV}^E = C_{LV}^E\{\rho\} \qquad \text{Equation (29)}$$

$$\dot{C}_B^{LV} = C_B^{LV}\{\omega\} - \{\rho + \Omega\}C_B^{LV} \qquad \text{Equation (30)}$$

where $\rho$ is the angular rate of the LV-frame with respect to the E-frame (i.e. the "transport rate"), $\omega$ is the angular rate of the B-frame with respect to the inertial frame (i.e. the angular rate measured by the gyroscope), and $\Omega$ is the angular rate of the E-frame with respect to the inertial frame (i.e. "Earth rate").

Error in the Fundamental Navigation DCM Parameters

The errors in the estimates of the navigation DCMs are defined with the classical phi-error model parameters $\epsilon$ and $\gamma$. These errors are defined as follows:

$$\hat{C}_E^{LV} = (I - \{\epsilon\})C_E^{LV} \qquad \text{Equation (31)}$$

$$\hat{C}_B^{LV} = (I - \{\gamma\})C_B^{LV} \qquad \text{Equation (32)}$$

With equations (4)-(6), the DCM errors are:

$$\delta C_E^{LV} = -\{\epsilon\}C_E^{LV} \qquad \text{Equation (33)}$$

$$\delta C_B^{LV} = -\{\gamma\}C_B^{LV} \qquad \text{Equation (34)}$$

For completeness, the classical psi-error model combines the $\epsilon$ and $\gamma$ errors into a single error state $\psi$. The error state $\psi$ represents the error in the estimated $\hat{C}_B^E$ matrix. This error parameter is defined as:

$$\hat{C}_B^E = (\hat{C}_E^{LV})^T \hat{C}_B^{LV} = C_{LV}^E(I - \{\psi\})C_B^{LV} \qquad \text{Equation (35)}$$

where $\psi \triangleq \gamma - \epsilon$.

The kinematics of $\epsilon$ and $\gamma$ in the prior art models are usually derived independently, and the kinematics of $\psi$ are derived from those. In the repartitioned model, the $\psi$-angle error state is not used, but it is defined here for clarity in how it is related to the other misalignment errors $\gamma$ and $\epsilon$. Note, the bold symbol $\psi$ is a vector parameter and it denotes the misalignment error in the estimated DCM $\hat{C}_B^E$. This symbol is not to be confused with the normal font symbol $\psi$ which represents the scalar-valued true heading.

Error in Earth Rate

The earth-rate vector $\Omega$ originates from the earth-frame, and can be written as:

$$\Omega = (C_{LV}^E)^T \Omega_E \qquad \text{Equation (36)}$$

Taking the variation of each side of equation (36) and noting that $\Omega_E$ is constant, yields:

$$\delta\Omega = (\delta C_{LV}^E)^T \Omega_E \qquad \text{Equation (37)}$$

Using the definition of $\delta C_{LV}^E$, it can be shown that:

$$\delta\Omega = \Omega \times \epsilon \qquad \text{Equation (38)}$$

Error State Kinematics

In the subsections to follow, for completeness, the kinematics of the error-states relevant to the repartitioned model are derived (following the classical derivation of these parameters).

Kinematics of the Error in $C_{LV}^E$

The $\epsilon$ and $\gamma$ kinematics (i.e., the epsilon and gamma kinematics) are derived as follows. Taking the variation of each side of the $\dot{C}_{LV}^E$ expression shown in equation (29) yields:

$$\delta \dot{C}_{LV}^E = \delta C_{LV}^E\{\rho\} + C_{LV}^E\{\delta\rho\} \qquad \text{Equation (39)}$$

Starting with equation (33), taking the transpose, and differentiating with respect to time yields:

$$\delta \dot{C}_{LV}^E = C_{LV}^E\{\rho\}\{\epsilon\} + C_{LV}^E\{\dot{\epsilon}\} \qquad \text{Equation (40)}$$

Equating the two expressions for $\delta \dot{C}_E^{LV}$ yields:

$$\{\dot{\epsilon}\} = -\{\rho\}\{\epsilon\} + \{\epsilon\}\{\rho\} + \{\delta\rho\} \qquad \text{Equation (41)}$$

In vector form, the above expression is written as:

$$\dot{\epsilon} = -\rho \times \epsilon + \delta\rho \qquad \text{Equation (42)}$$

Kinematics of the Error in $C_B^{LV}$

Next, taking the variation of each side of the $\dot{C}_B^{LV}$ expression shown in equation (30) yields:

$$\delta \dot{C}_B^{LV} = \delta C_B^{LV}\{\omega\} + C_B^{LV}\{\delta\omega\} - \{\delta\rho + \delta\Omega\}C_B^{LV} - \{\rho + \Omega\}\delta C_B^{LV} \qquad \text{Equation (43)}$$

Starting with equation (34), differentiating with respect to time yields:

$$\delta \dot{C}_B^{LV} = -\{\dot{\gamma}\}C_B^{LV} - \{\gamma\}(C_B^{LV}\{\omega\} - \{\rho + \Omega\}C_B^{LV}) \qquad \text{Equation (44)}$$

Equating the two expressions for $\delta \dot{C}_B^{LV}$ yields:

$$\{\dot{\gamma}\} = \{\gamma\}\{\rho + \Omega\} - \{\rho + \Omega\}\{\gamma\} - \{C_B^{LV}\delta\omega\} + \{\delta\rho + \delta\Omega\} \qquad \text{Equation (45)}$$

In vector form, the above expression is written as:

$$\dot{\gamma} = (\rho + \Omega) \times \gamma - C_B^{LV}\delta\omega + \delta\rho + \delta\Omega \qquad \text{Equation (46)}$$

Inserting equation (38) into equation (46) yields:

$$\dot{\gamma} = -(\rho + \Omega) \times \gamma + \Omega \times \epsilon + \delta\rho - C_B^{LV}\delta\omega \qquad \text{Equation (47)}$$

Summary of the Error State Kinematics

The error state kinematics are summarized as follows:

$$\dot{\epsilon} = -\rho \times \epsilon + \delta\rho \qquad \text{Equation (48)}$$

$$\dot{\gamma} = -(\rho + \Omega) \times \gamma + \Omega \times \epsilon + \delta\rho - C_B^{LV}\delta\omega \qquad \text{Equation (49)}$$

where $\delta\rho$ is the error in the transport rate term. In the classical phi-model, the transport rate error is a function of other fundamental phi-error model parameters, but they are beyond the scope of this invention, which is primarily concerned with attitude and heading errors. Those skilled in the art will incorporate the additional error parameters (namely position and velocity errors) as needed for their respective application.

Initialization of Filter Uncertainties

Since the initialization of navigation systems depends upon initial estimates of roll, pitch, heading, latitude, and longitude, those errors are transformed into the error parameters of the filter states as defined in the previous section. The transformation of the initial errors in roll, pitch, heading, latitude, and longitude into the $\epsilon$ and $\gamma$ error states is defined next.

Earth-to-LV Errors

The definitions of the Earth to local vertical (E-to-LV) DCM in terms of the estimated initial values are:

$$(C_E^{LV})_0 \triangleq M_3(\alpha_0)M_2(-\lambda_0 - \pi/2)M_3(\Lambda_0) \qquad \text{Equation (50)}$$

The errors in the initial angle estimates are:

$$\alpha_0 = \alpha(0) + \delta\alpha_0 \qquad \text{Equation (51)}$$

$$\lambda_0 = \lambda(0) + \delta\lambda_0 \qquad \text{Equation (52)}$$

$$\Lambda_0 = \Lambda(0) + \delta\Lambda_0 \qquad \text{Equation (53)}$$

Using the definitions in equations (51)-(53), the initial E-to-LV matrix in equation (50) is rewritten as:

$$(C_E^{LV})_0 = M_3(\delta\alpha_0)M_3(\alpha(0)) \qquad \text{Equation (54)}$$
$$M_2(-\delta\lambda_0)M_2\left(-\lambda(0) - \frac{\pi}{2}\right)M_3(\delta\Lambda_0)M_3(\Lambda(0))$$

The errors in the initial estimates of wander angle, latitude, and longitude can be defined as small angle rotations:

$$M_3(\delta\Lambda_0) \triangleq I - \{u_z\}\delta\Lambda_0, M_2(\delta\lambda_0) \triangleq I - \{u_y\}(\delta\lambda_0), \text{ and}$$
$$M_3(\delta\alpha_0) \triangleq I - \{u_z\}\delta\alpha_0,$$

Equation (55)

where:

$$u_z \triangleq \begin{bmatrix} 0 \\ 0 \\ 1 \end{bmatrix} \text{ and } u_y \triangleq \begin{bmatrix} 0 \\ 1 \\ 0 \end{bmatrix}$$

Equation (56)

Inserting these definitions into equation (54) yields:

$$(C_E^{LV})_0 \approx (I - \{u_z\}\delta\alpha_0)M_3(\alpha(0))(I - \{u_y\}(-\delta\lambda_0))$$
$$M_2\left(-\lambda(0) - \frac{\pi}{2}\right)(I - \{u_z\}\delta\Lambda_0)M_3(\Lambda(0))$$

Equation (57)

After some manipulation and assuming that second order terms are small, equation (57) is rewritten as:

$$(C_E^{LV})_0 \approx \left(I - \{u_z\delta\alpha_0 - M_3(\alpha(0))u_y\delta\lambda_0 + M_3(\alpha(0))M_2\left(-\lambda(0) - \frac{\pi}{2}\right)u_z\delta\Lambda_0\}\right)C_E^{LV}(0)$$

Equation (58)

Using the definition of the error parameter $\epsilon$ given by equation (31), another expression for $(C_E^{LV})_0$, with notation to indicate the initial value of $\epsilon$, is:

$$(\hat{C}_E^{LV})_0 = (I - \{\epsilon_0\})C_E^{LV}(0)$$

Equation (59)

Comparing equation (59) to equation (58) it can be seen that:

$$\epsilon_0 \approx$$

Equation (60)

$$u_z\delta\alpha_0 - M_3(\alpha(0))u_y\delta\lambda_0 + M_3(\alpha(0))M_2\left(-\lambda(0) - \frac{\pi}{2}\right)u_z\delta\Lambda_0$$

Using the definitions of the $M_i$ rotations and the angle error vectors, equation (60) can be simplified to:

$$\epsilon_0 \approx M_{\epsilon_0}[\delta\alpha_0 \delta\lambda_0 \delta\Lambda_0]^T$$

Equation (61)

where:

$$M_{\epsilon_0} \triangleq \begin{bmatrix} 0 & -\sin(\alpha(0)) & \cos(\alpha(0))\cos(\lambda(0)) \\ 0 & -\cos(\alpha(0)) & -\sin(\alpha(0))\cos(\lambda(0)) \\ 1 & 0 & -\sin(\lambda(0)) \end{bmatrix}$$

Equation (62)

Using the definitions of the initial values, equation (62) is rewritten as:

$$\hat{M}_{\epsilon_0} \triangleq \begin{bmatrix} 0 & -\sin\alpha_0 & \cos\alpha_0\cos\lambda_0 \\ 0 & -\cos\alpha_0 & -\sin\alpha_0\cos\lambda_0 \\ 1 & 0 & -\sin\lambda_0 \end{bmatrix}$$

Equation (63)

The covariance of $\epsilon_0$ is:

$$\text{cov}(\epsilon_0) = \hat{M}_{\epsilon_0} \text{cov}([\delta\alpha_0 \delta\lambda_0 \delta\Lambda_0]^T)\hat{M}_{\epsilon_0}^T.$$

Equation (64)

The expression for $\epsilon_0$ may be generalized to any time:

$$\epsilon \approx M_\epsilon[\delta\alpha\delta\lambda\delta\Lambda]^T,$$

Equation (65)

where:

$$M_\epsilon \triangleq \begin{bmatrix} 0 & -\sin\alpha & \cos\alpha\cos\lambda \\ 0 & -\cos\alpha & -\sin\alpha\cos\lambda \\ 1 & 0 & -\sin\lambda \end{bmatrix}.$$

Equation (66)

In the above expression the time argument (t) has been omitted for variables $\alpha(t)$ and $\lambda(t)$. Equation (65) also implies:

$$[\delta\alpha\delta\lambda\delta\Lambda]^T = M_\epsilon^{-1}\epsilon$$

Equation (67)

where:

$$M_\epsilon^{-1} = \begin{bmatrix} \cos\alpha\tan\lambda & -\sin\alpha\tan\lambda & 1 \\ -\sin\alpha & -\cos\alpha & 0 \\ \cos\alpha\sec\lambda & -\sin\alpha\sec\lambda & 0 \end{bmatrix}.$$

Equation (68)

If the current wander angle at time t, denoted $\alpha(t)$, is defined as the initial wander angle plus a change in wander angle, then:

$$\alpha(t) \triangleq \alpha_0 + \Delta\alpha(t)$$

Equation (69)

In the repartitioned model from Table 1, the initial wander angle is initialized using $\hat{\Psi}_0$. Substituting this into equation (69) gives:

$$\alpha(t) = \Psi_0 + \Delta\alpha(t)$$

Equation (70)

This shows that $\alpha(t)$ is a function of $\Psi_0$, and it implies that all of the error in the estimate of $\Psi_0$ resides in the error of the estimate of $\alpha(t)$. Furthermore, since equation (67) implies the error $\delta\alpha$ is fully parameterized by $\epsilon$, then according to equation (70) the error in $\Psi_0$ is likewise fully parameterized by $\epsilon$. Conversely, in the repartitioned model, this implies the initial heading error is not a function of $\gamma$ since it is fully parameterized by $\epsilon$. In addition, recall, the error $\epsilon$ directly measures the error in the computed navigation parameter $\hat{C}_E^{LV}$. As noted earlier, these are important aspects in regard to satisfying the key features of the technology described herein. Next, it will be shown that the error in accumulated heading-change is fully parameterized by $\gamma$.

LV-to-Body Errors

A similar procedure to that just described above is followed for deriving the initialization of the $\gamma$ vector covariance. The initialization for the LV-to-B DCM is restated here:

$$(C_{LV}^B)_0 \triangleq M_1(\phi_0)M_2(\theta_0)M_3(\psi_0^c)$$

Equation (71)

The errors in the initialization parameters are defined as follows:

$$\phi_0 \triangleq \phi(0) + \delta\phi_0$$

Equation (72)

$$\theta_0 \triangleq \theta(0) + \delta\theta_0$$

Equation (73)

$$\psi_0^c \triangleq \psi^c(0) + \delta\psi_0^c$$

Equation (74)

A procedure analogous to the one used in equations (54) through equation (61) for determining the expression for $\epsilon_0$ is carried out to find an expression for $\gamma_0$ in terms of the errors in the initial estimates of roll, pitch, and computational heading. This expression is:

$$\gamma_0 \approx M_{\gamma_0} \begin{bmatrix} \delta\phi_0 \\ \delta\theta_0 \\ \delta\psi_0^c \end{bmatrix},$$

Equation (75)

where:

$$M_{\gamma_0} = \begin{bmatrix} -\cos(\theta(0))\cos(\psi^c(0)) & \sin(\psi^c(0)) & 0 \\ -\cos(\theta(0))\sin(\psi^c(0)) & -\cos(\psi^c(0)) & 0 \\ \sin(\theta(0)) & 0 & -1 \end{bmatrix}.$$

Equation (76)

Equation (76) is rewritten in terms of the initial values to yield:

$$\hat{M}_{\gamma_0} = \begin{bmatrix} -\cos\theta_0\cos\psi_0^c & \sin\psi_0^c & 0 \\ -\cos\theta_0\sin\psi_0^c & -\cos\psi_0^c & 0 \\ \sin\theta_0 & 0 & -1 \end{bmatrix}.$$

Equation (77)

The covariance of $\gamma_0$ is:

$$\text{cov}(\gamma_0) = \hat{M}_{\gamma_0} \text{cov}([\delta\phi_0 \delta\theta_0 \delta\psi_0^c]^T) \hat{M}_{\gamma_0}^T$$

Equation (78)

Like the expression for $\epsilon_0$, the relationship in equation (75), which governs the initial errors $\gamma$ errors, may be generalized to any time:

$$\gamma = M_\gamma \begin{bmatrix} \delta\phi \\ \delta\theta \\ \delta\psi^c \end{bmatrix}$$

Equation (79)

In addition, this expression may be inverted:

$$\begin{bmatrix} \delta\phi \\ \delta\theta \\ \delta\psi^c \end{bmatrix} = M_\gamma^{-1} \gamma,$$

Equation (80)

where $$M_\gamma^{-1} = \begin{bmatrix} -\sec\theta\cos\psi^c & -\sec\theta\sin\psi^c & 0 \\ \sin\psi^c & -\cos\psi^c & 0 \\ -\sin\theta\cos\psi^c\sec\theta & -\sin\theta\sin\psi^c\sec\theta & -1 \end{bmatrix}.$$

Equation (81)

As before with the wander angle, if the current computational heading at time t, denoted $\psi^c(t)$, is defined as the initial computational heading plus a change in computational heading, then:

$$\psi^c(t) \triangleq \psi_0^c + \Delta\psi^c(t)$$

Equation (82)

In Table 1, the initial computational heading, $\psi_0^c$, is set to zero to represent the initial accumulated heading-change. Equation (82) then becomes:

$$\psi^c(t) = \Delta\psi^c(t)$$

Equation (83)

Next, recalling from equation (16) that the true heading $\psi(t)$ was shown to be the sum of the wander angle plus the computational heading, one may write:

$$\psi(t) + \alpha(t) + \psi^c(t)$$

Equation (84)

Substituting equations (70) and (83) into equation (84) yields:

$$\psi(t) = \Psi_0 + \Delta\alpha(t) + \Delta\psi^c(t)$$

Equation (85)

Next, since the true heading is also defined as the sum of the initial heading and the accumulated change in heading, equation (17), equation 85 may be equated with equation (17), yielding:

$$\Delta\alpha(t) + \Delta\psi^c(t) = \Delta\psi(t)$$

Equation (86)

This expression may be rearranged as:

$$\Delta\psi^c(t) = \Delta\psi(t) - \Delta\alpha(t)$$

Equation (87)

Finally, inserting equation (87) into equation (83), yields:

$$\psi^c(t) = \Delta\psi(t) - \Delta\alpha(t)$$

Equation (88)

Equation (88) demonstrates that the computational heading directly encompasses the entire accumulated heading-change parameter $\Delta\psi(t)$. Thus, according to equation (80), the error in the computational heading is fully parameterized by the error $\gamma$. By implication, the error in the accumulated heading-change must then also be fully parameterized by the error vector $\gamma$. This aspect ensures the two key features of this invention are satisfied. Specifically, the heading error has been estimated with two independent and distinct states (one for the error in the initial-heading and one for the error in the accumulated heading-change since the INS startup) and the heading error states directly correspond to navigation quantities explicitly computed in the INS.

Summary of the Initialization of DCM Error State Misalignments

The 3D attitude error initialization values are summarized and updated expressions for use in the repartitioned model are given next. As shown in column three of the Table 1, the initial angles for the repartitioned model are initialized according to:

$$\alpha_0 = \hat{\Psi}_0 \; \phi_0 = \hat{\phi}_0$$

$$\lambda_0 = \hat{\lambda}_0 \text{ and } \theta_0 = \hat{\theta}_0$$

$$\Lambda_0 = \hat{\Lambda}_0 \; \psi_0^c = 0$$

Equations (89)

Next, from the relationships given in Equation (89), the errors in these input values are used to define the initial errors of the repartitioned error model. From these assignments the errors are written as:

$$\delta\alpha_0 = \delta\Psi(0) \; \delta\phi_0 = \delta\phi(0)$$

$$\delta\lambda_0 = \delta\lambda(0) \text{ and } \delta\theta_0 = \delta\theta(0)$$

$$\delta\Lambda_0 = \delta\Lambda(0) \; \delta\psi_0^c = 0$$

Equations (90)

Inserting these values into the initialization equations for the model parameters $\epsilon_0$ and $\gamma_0$ in equations (50), (63), (64), (71), (77), and (78) yields:

$$\hat{M}_{\epsilon_0} \triangleq \begin{bmatrix} 0 & -\sin\hat{\Psi}_0 & \cos\hat{\Psi}_0\cos\hat{\lambda}_0 \\ 0 & -\cos\hat{\Psi}_0 & -\sin\hat{\Psi}_0\cos\hat{\lambda}_0 \\ 1 & 0 & -\sin\hat{\lambda}_0 \end{bmatrix}.$$

Equation (91)

$$\hat{M}_{\gamma_0} \triangleq \begin{bmatrix} -\cos\hat{\theta}_0 & 0 & 0 \\ 0 & -1 & 0 \\ \sin\hat{\theta}_0 & 0 & -1 \end{bmatrix}$$

Equation (92)

$$\text{cov}(\epsilon_0) = \hat{M}_{\epsilon_0} \text{cov}([\delta\Psi(0) \; \delta\lambda(0) \; \delta\Lambda(0)]^T) \hat{M}_{\epsilon_0}^T$$

Equation (93)

$$\text{cov}(\gamma_0) = \hat{M}_{\gamma_0} \text{cov}([\delta\phi(0) \; \delta\theta(0) \; 0]^T) \hat{M}_{\gamma_0}^T$$

Equation (94)

-continued $$(C_E^{LV})_0 = M_3(\hat{\Psi}_0)M_2\left(-\hat{\lambda}_0 - \frac{\pi}{2}\right)M_3(\hat{\Lambda}_0) \qquad \text{Equation (95)}$$

and $$(C_{LV}^B)_0 \triangleq M_1(\hat{\phi}_0)M_2(\hat{\theta}_0) \qquad \text{Equation (96)}$$

In summary, the repartitioned model presented herein treats the heading error as two separate errors to be individually estimated. The two key features of the repartitioned model are repeated here: 1) estimating the heading error with two independent and distinct states: one for the error in the initial-heading and one for the error in the accumulated heading-change since the INS startup; and 2) ensuring the heading error states directly correspond to navigation quantities explicitly computed in the INS.

Now that mathematical background used to satisfy the two key features of the repartitioned model has been described, the system and method of implementing the repartitioned model used to mitigate heading inconsistency in INS with low-performance IMUs with relative aiding and infrequent absolute aiding is described with reference to the Figures. The embodiments of the systems and method described herein can be used on a person, a robot, an animal, or a vehicle (e.g., a land based vehicle, a water-based vehicle, or an aircraft).

FIG. 1 shows a navigation system 10 including at least one low-performance IMU sensor using a repartitioned heading error to mitigate filter inconsistency of the heading estimates. Specifically, the heading inconsistency is reduced (i.e., the heading consistency is improved) over prior art systems that do not partition the heading error as described herein. The terms "navigation system", "inertial navigation system", and "system" are used interchangeably herein. In one implementation of this embodiment, the inertial navigation system 10 is a strapdown inertial navigation system 10.

Navigation system 10 includes sensors 110, at least one processor 130, a navigation filter 150, and a strapdown navigation module 160. The navigation filter 150 and the strapdown navigation module 160 are algorithms 140 stored in a computer readable storage medium 80. The sensors 110 include at least one low-performance IMU 120 and relative aiding sensors 113. The low-performance IMU 120 includes gyroscopes 111 and/or accelerometers 112. At least one of the gyroscopes 111 is a low-performance gyroscope, which, when integrated, accumulates errors over time and/or at least one of the accelerometers 112 is a low-performance accelerometer, which, when integrated, accumulates errors over time. The at least one relative aiding sensor 113 provides intermittent navigation aiding measurements to the at least one processor 130. The at least one relative aiding sensor 113 (also referred to herein as relative navigational aiding sensor 113) is unable to directly sense the initial-heading since they are unable to independently register themselves in inertial space as noted above.

The sensors 110 output navigation measurements to the algorithms 140 and/or the at least one processor 130. The at least one low performance IMU 120 inputs inertial measurements to the strapdown navigation module 160. The at least one relative aiding sensor 113 inputs at least one measurement of navigation data to the navigation filter 150.

The strapdown navigation module 160 includes: an initial-heading estimate module 161; and an accumulated heading-change estimate module 162. The strapdown navigation module 160 is configured to input an initial heading from a heading source. The accumulated heading-change estimate module 162 is configured to initialize an accumulated heading-change estimate to zero at a startup of the at least one low-performance IMU 120.

The navigation filter 150 includes: an initial-heading uncertainty estimate module 152; an accumulated heading-change uncertainty estimate module 153; and a joint probability density function (PDF) module 151. The joint PDF of position, velocity, attitude, and heading of an inertial navigation system is referred to herein as a joint PDF. The navigation filter 150 is configured to input an initial-heading uncertainty level. The accumulated heading-change uncertainty estimate module 153 in the navigation filter 150 is configured to be initialized with an initial accumulated heading-change uncertainty level that is less than the initial-heading uncertainty level. The joint PDF module 151 is designed to estimate the joint-distribution of position, velocity, attitude, and heading of an inertial navigation system and output a total heading estimate.

The initial heading and the initial-heading uncertainty level can be input from a source external to the sensors 110. In one implementation of this embodiment, a user of the inertial navigation system 10 can input the initial-heading uncertainty level. The initial accumulated heading-change uncertainty level must be set to a value less than the initial-heading uncertainty level. In another implementation of this embodiment, an operator preparing a robot for operation can input the initial heading and the initial-heading uncertainty level.

The at least one processor 130 (also referred to herein as processor 130) is configured to: execute the algorithms 140 to estimate an initial-heading error using a state that is independent from an estimated error in an accumulated heading-change since startup; and to select an error state vector with components for estimating the error in the initial-heading and the error in the accumulated heading-change since the startup of the inertial navigation system. In this embodiment, at least one processor 130 executes the algorithms 140 in the strapdown navigation module 160 and in the navigation filter 150 to:

estimate an initial-heading error using a state that is independent of an estimated error in an accumulated heading-change since a startup of at least one low-performance inertial measurement unit (IMU 120) in the inertial navigation system 10;

define a local-vertical frame in which an initial wander angle equals an initial-heading angle;

initialize the heading component of an uncertainty estimate in an Earth-to-Local-Vertical transformation with an initial-heading uncertainty level;

initialize the heading component of an uncertainty estimate in a Body-to-Local-Vertical transformation with a value less than the initial-heading uncertainty level;

assign an initial-heading uncertainty level to a third component of an epsilon angle $\epsilon$-vector; and assign a value that is less than the initial-heading uncertainty level to a third component of a $\gamma$-vector.

Figure 2:
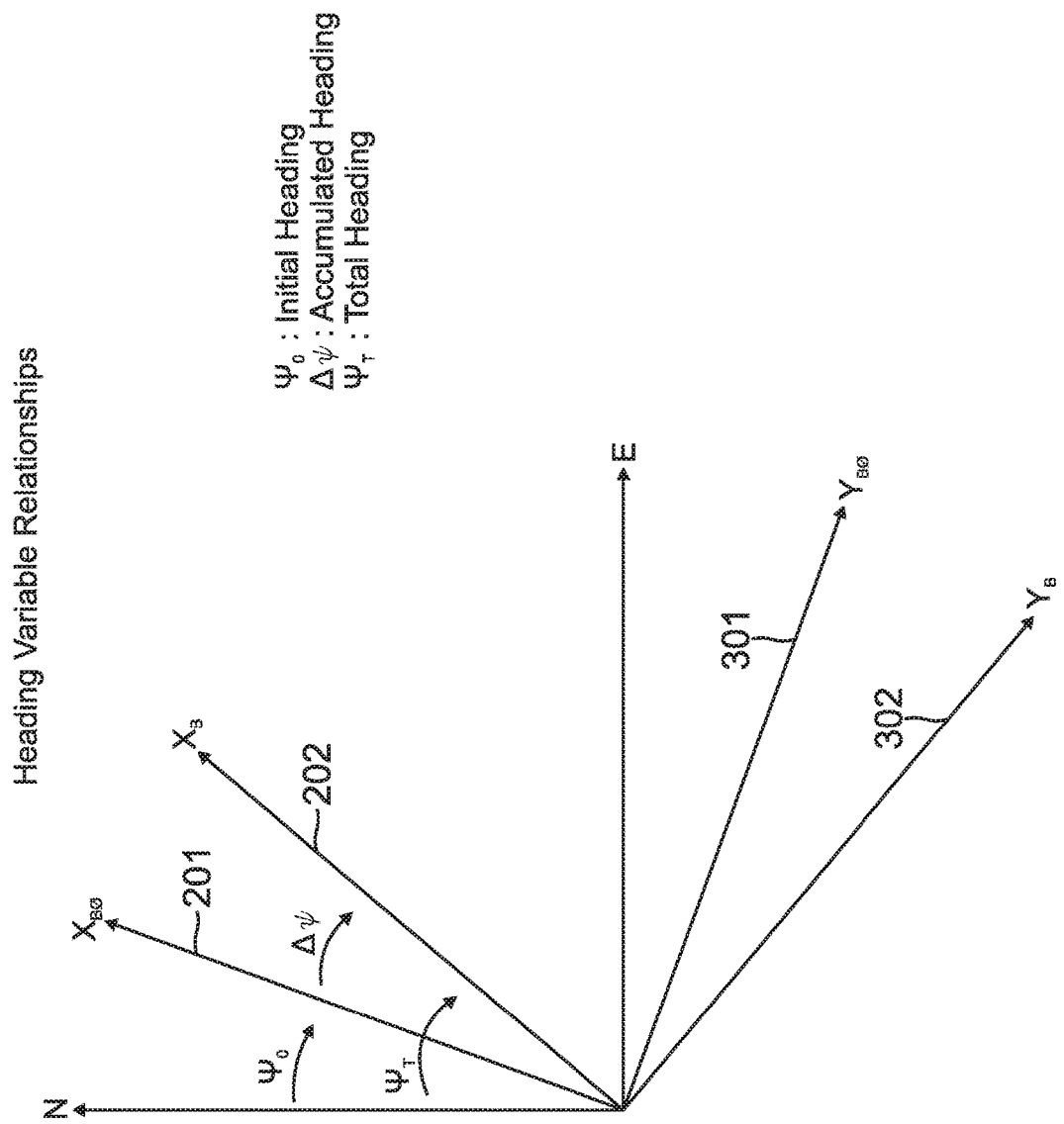
FIG. 2 shows a simplistic relationship of the heading variables with reference to the X axis of the body ($X_B$) and the Y axis of the body ($Y_B$) without the wander angle.

FIG. 2 shows a simplistic relationship of the heading variables with reference to the X axis of the body ($X_B$) and the Y axis of the body ($Y_B$) without the wander angle. The heading variable, as described above, includes: North (N), East (E), the initial-heading ($\Psi_0$) with reference to the initial X axis of the body ($X_{B0}$) represented generally at line 201, the total heading ($\Psi_T$) represented generally at line 202 after line 201 has rotated by an amount equal to the accumulated heading-change ($\Delta\psi$). The initial Y axis of the body ($Y_{B0}$) is represented generally at line 301. Line 301 is also rotated by an amount equal to the accumulated heading-change ($\Delta\psi$) to line 302. The accumulated heading-change ($\Delta\psi$) is the heading accumulated since the initial-heading was input.

Figure 3:
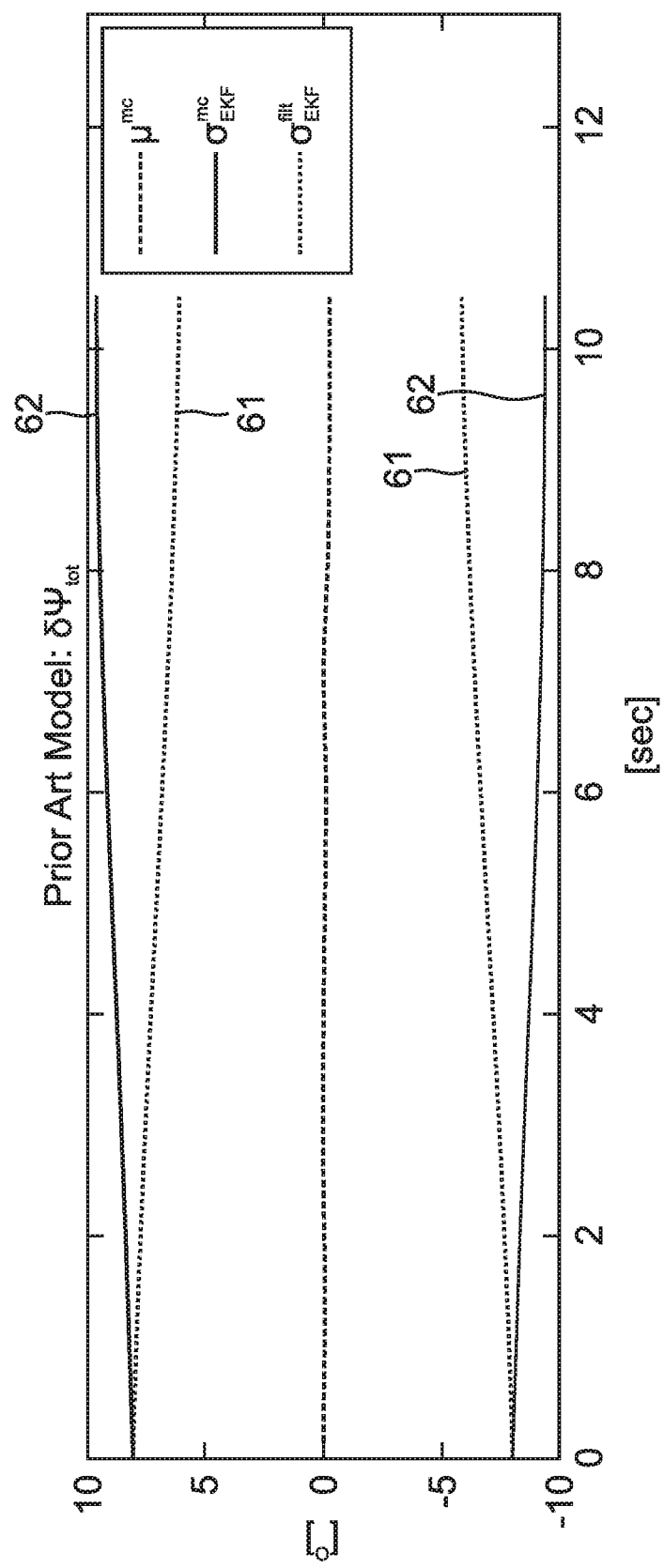
FIG. 3 shows the heading inconsistency over time for a simulated prior art planar-positioning navigation system including at least one low-performance IMU sensor and relative aiding sensors.
Figure 4:
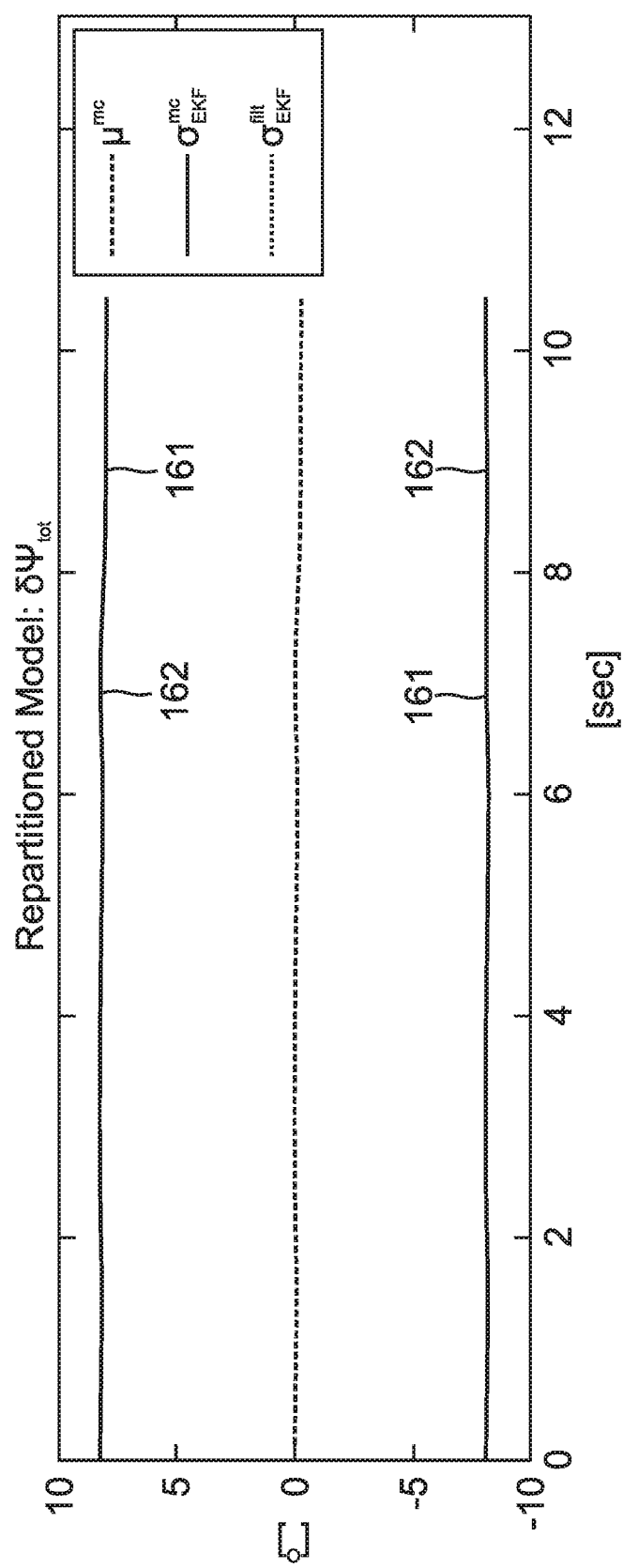
FIG. 4 shows a reduction in heading inconsistency over time for a simulated repartitioned planar-positioning navigation system including at least one low-performance IMU sensor and relative aiding sensors.

The advantage of partitioning the heading error is clearly seen in FIGS. 3 and 4. FIG. 3 shows the heading inconsistency over time for a simulated prior art planar-positioning navigation system including at least one low-performance IMU sensor and relative aiding sensors. FIG. 3 shows the deleterious effects of heading inconsistency over time in prior art systems that do not use a repartitioned model. FIG. 4 shows a reduction in heading inconsistency over time for a simulated repartitioned planar-positioning navigation system including at least one low-performance IMU sensor and relative aiding sensors. The plots in FIGS. 3 and 4 are based on identical sets of sensor data processed in two 500-trial Monte Carlo runs. FIG. 3 shows the heading estimation performance using prior art error models and related algorithms. FIG. 4 shows the heading estimation performance using the repartitioned model and related algorithms.

In FIG. 3, lines 61 show the uncertainty versus time as predicted for a prior art navigation system in which a low-performance IMU is aided only with relative sensors. In FIG. 3, lines 62 show the actual uncertainty versus time for the prior art navigation system in which a low-performance IMU is aided only with relative sensors. The difference between line 61 and line 62 in the positive and in the negative region diverges (becomes larger) over time. This result exhibits inconsistency in the heading estimation by this filter.

In FIG. 4, lines 161 show the uncertainty versus time as predicted for the inertial navigation system 10 in which a low-performance IMU is aided only with relative sensors. In FIG. 4, lines 162 show the actual uncertainty versus time for the inertial navigation system 10 in which a low-performance IMU is aided only with relative sensors. In FIG. 4, the predicted uncertainty and the actual uncertainty, shown in respective lines 161 and 162, overlap over time. The lack of divergence between the predicted uncertainty and the actual uncertainty indicates the improved heading consistency, over prior art systems that do not partition the heading error. The differences between these simulations shown in FIGS. 3 and 4 demonstrate good navigation heading consistency performance requires more than choosing the right sensors (recall, the same set of sensor data was processed by the model of FIG. 3 and of FIG. 4) or the right parameters. The overall state space system design, specifically the error state selection (i.e. partitioning), is critical to yielding good performance in some applications.

Repartitioning the state space for navigation requires the repartitioning of the error state. The solution requires the proper choice of coordinates and variables for the navigation system, which are generalized in relation to the aiding sensors, towards the purpose of mitigating heading inconsistency. In prior art systems, the primary factors that drive error parameter selection are computational efficiency, numerical stability, equation simplicity, and minimal representation. When filter performance problems are encountered in prior art systems, the proposed solutions typically focus on higher-order effects.

As stated earlier, the repartitioning requirements for heading to resolve heading inconsistency in INS with low-performance IMUs, relative aiding, and infrequent absolute aiding are: 1) estimating the heading error with two independent states: one for the error in the initial-heading and one for the error in the accumulated heading-change since the INS startup; and 2) ensuring the heading error states directly correspond to navigation quantities explicitly computed in the INS. The justification for these requirements may also be reasoned based on the fundamental physics underlying relative aiding sensors (i.e., any non-holonomic constrained measurements). Since these types of sensors are not sensitive to initial-heading, it is, therefore, advantageous to prevent any direct coupling to initial-heading error from appearing in the measurement sensitivity equations of relative aiding sensors. For example, the measurement sensitivity equation for a Doppler velocity sensor, when using the classical $\psi$-error model, contains sensitivity to the $\psi$-angle error, where the $\psi$-angle error is the error in the $C_{L'}^{E}$ DCM defined in equation (35), which contains both the initial heading error and the accumulated heading-change error. This is undesirable since the error state that estimates the initial heading error appears in the measurement sensitivity equation for a sensor that cannot observe initial-heading. As cited earlier in this text, Kasper expects this objection to the $\psi$-error model and offers a reply. Kasper shows that the sensitivity to the initial-heading error "cancels out" of the Doppler velocity measurement sensitivity equation when one consider the entire filter cycle (i.e., the filter predication step and the filter update step). The problem in this defense is that it relies on an exact analytical cancellation of terms. This exact cancellation assumes the filter is operating on true states. But, since any real-time filter does not have access to the true states, only the estimates of true states, this exact cancellation cannot be assumed As a result of the preceding analysis, the $\psi$-angle error should not be used in a navigation system error state vector when the navigation system relies heavily on relative aiding sensors, since the states observable by these sensors are not adequately modeled.

Thus the embodiments of systems implementing the methods disclosed herein differs from prior art inertial navigation error modeling in the: selection of 3D attitude error states and the allocation of the 3D attitude errors. This repartitioning of the 3D attitude error states allows the measurement sensitivity equations for a relative aiding sensors to be written in terms of variables that are directly observable to those sensors.

Figure 5:
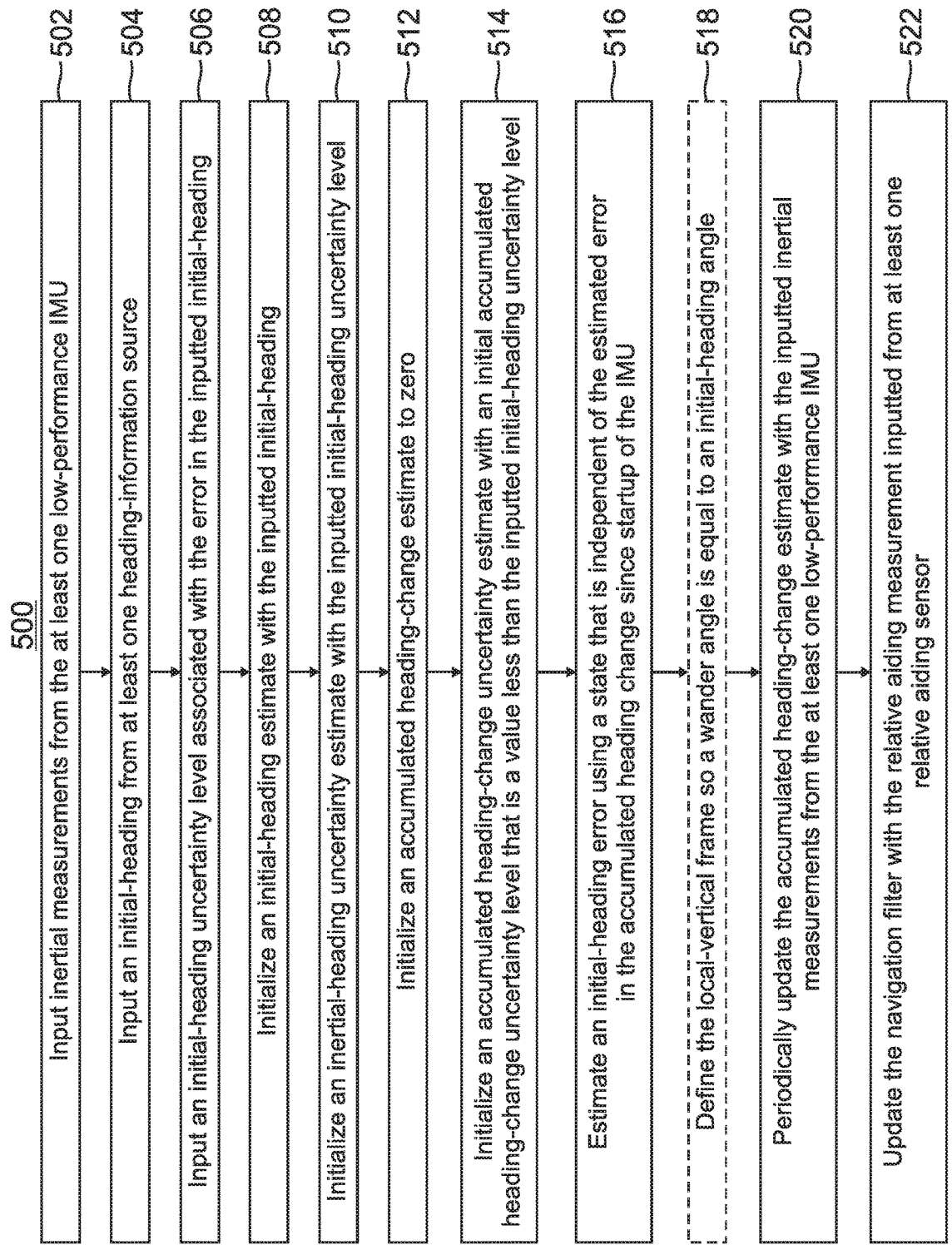
FIG. 5 is a flow diagram of a method of mitigating filter inconsistency of a heading estimate in an inertial navigation system.

FIG. 5 is a flow diagram of a method 500 of mitigating filter inconsistency in a heading estimate in an inertial navigation system. The method is described with reference to inertial navigation system 10 shown in FIG. 1. It is understood that method 500 can be implemented using navigation systems, which have different system configurations. The at least one processor 130 executes algorithms 140 to implement method 500.

At block 502, inertial measurements are input from at least one low-performance IMU 120 in the inertial navigation system 10. In one implementation of this embodiment, the inertial measurements are input from at least one low-performance IMU 120 to a strapdown navigation module 160. At block 504, an initial-heading is input from at least one heading-information source. The at least one heading-information source can be a user of the inertial navigation system 10. In one implementation of this embodiment, the initial-heading is input from at least one heading-information source to the strapdown navigation module 160. At block 506, an initial-heading uncertainty level associated with an error in the inputted initial-heading is input. In one implementation of this embodiment, the initial-heading uncertainty level associated with an error in the inputted initial-heading is input to the navigation filter 150. In another implementation of this embodiment, the initial-heading uncertainty level associated with an error in the inputted initial-heading is input to the initial-heading uncertainty estimate module 152 in the navigation filter 150.

At block 508, an initial-heading estimate is initialized with the inputted initial-heading. At block 510, an initial-heading uncertainty estimate is initialized with the inputted initial-heading uncertainty level (IHUL) (FIG. 1). At block 512, an accumulated heading-change estimate is initialized to zero at a startup of the at least one low-performance IMU 120. At block 514, an accumulated heading-change uncertainty estimate is initialized with an accumulated heading-change uncertainty level that is a value less than the inputted initial-heading uncertainty level (IHUL).

At block 516, an initial-heading error is estimated using a state that is independent of an estimated error in an accumulated heading-change since the startup of the at least one low performance IMU 120. Block 518 is optional. At block 518, a local-vertical frame is defined so a wander angle is equal to an initial-heading angle. This is shown in row 1, column 3 of Table 1.

At block 520, the accumulated heading-change estimate is periodically updated with the inertial measurements input from the at least one low-performance IMU 120. At block 522, the navigation filter is updated with the relative aiding measurement inputted from at least one relative aiding sensor 113. The inertial navigation system 10 is also configured to input an initial heading from at least one sensor that is able to provide absolute aiding information. For example, if a user of the inertial navigation system 10 (e.g., a person or robot to which the inertial navigation system 10 is strapped) moves from inside a building to outside the building the inertial navigation system 10 is able to obtain an accurate position from a global position system (GPS) receiver that is also in the inertial navigation system 10 (or is communicatively coupled to the inertial navigation system 10). This GPS data can be used to update the navigation solution. In this case, the navigation filter state estimates are updated when the at least one (or more) relative aiding sensor provides intermittent navigation aiding measurements.

The at least one processor 130 includes or functions with software programs, firmware or other computer readable instructions for carrying out various methods, process tasks, calculations, and control functions, used in the navigation systems described herein that have little or no heading inconsistency over time.

The processor 130 executes software and/or firmware that causes the processor 130 to perform at least some of the processing described here as being performed by the inertial navigation system 10. At least a portion of such software and/or firmware executed by the processor 130 and any related data structures are stored in storage medium 80 during execution. Memory in the storage medium 80 and/or the at least one processor 130 comprises any suitable memory now known or later developed such as, for example, random access memory (RAM), read only memory (ROM), and/or registers within the processor 130. In one implementation, the processor 130 comprises a microprocessor or microcontroller. In one implementation, the processor 130 and memory are implemented in a single device (for example, a single integrated-circuit device). The software and/or firmware executed by the processor 130 comprises a plurality of program instructions that are stored or otherwise embodied on a storage medium 130 from which at least a portion of such program instructions are read for execution by the processor 130. In one implementation, the processor 130 comprises processor support chips and/or system support chips such as application specific integrated circuits (ASICs) or field programmable gate arrays (FPGAs).

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Example Embodiments

Example 1 includes a method of mitigating filter inconsistency of a heading estimate in an inertial navigation system, the method comprising: inputting inertial measurements from at least one low-performance inertial measurement unit (IMU) in the inertial navigation system; inputting an initial-heading from at least one heading-information source; inputting an initial-heading uncertainty level associated with an error in the inputted initial-heading; initializing an initial-heading estimate with the inputted initial-heading; initializing an initial-heading uncertainty estimate with the inputted initial-heading uncertainty level; initializing an accumulated heading-change estimate to zero at a startup of the at least one low-performance IMU; initializing an accumulated heading-change uncertainty estimate with an initial accumulated heading-change uncertainty level that is a value less than the inputted initial-heading uncertainty level; periodically updating the accumulated heading-change estimate with the inertial measurements input from the at least one low-performance IMU; inputting at least one relative aiding measurement from at least one relative aiding sensor; and updating the navigation filter with the relative aiding measurement inputted from at least one relative aiding sensor.

Example 2 includes the method of Example 1, further comprising: inputting at least one measurement from at least one relative aiding sensor, which is unable to directly sense the initial-heading.

Example 3 includes the method of any of Examples 1-2, further comprising: estimating a joint probability density function (PDF) of a position, a velocity, an attitude, and a heading of the inertial navigation system.

Example 4 includes the method of Example 3, further comprising: generating the heading estimate and a heading uncertainty estimate from the estimated joint PDF, which includes the initial-heading estimate, the initial-heading uncertainty estimate, the accumulated heading-change estimate, and the accumulated heading-change uncertainty estimate.

Example 5 includes the method of any of Examples 1-4, further comprising: initializing a heading component of an uncertainty estimate in an Earth-to-Local-Vertical transformation with the initial-heading uncertainty level; and initializing a heading component of an uncertainty estimate in a Body-to-Local-Vertical transformation with the initial accumulated heading-change uncertainty level, which is the value less than the initial-heading uncertainty level.

Example 6 includes the method of Example 5, further comprising: initializing a Local-Vertical frame so a wander angle is equal to the initial-heading angle; and initializing the heading component of the Body-to-Local-Vertical transformation with a value of zero.

Example 7 includes the method of any of Examples 1-6, further comprising: estimating an initial-heading error using a first filter error state; and estimating an accumulated heading-change error using a second filter error state; wherein the first error state is an independent and distinct error state from the second filter error state.

Example 8 includes the method of any of Examples 1-7, wherein inputting inertial measurements from the at least one low-performance IMU in the inertial navigation system comprises inputting inertial measurements from at least one low-performance IMU in a strapdown inertial navigation system, the method further comprising: inputting at least one measurement from at least one relative aiding sensor, which is unable to directly sense the initial-heading.

Example 9 includes a method of mitigating filter inconsistency in a heading estimate from a navigation filter designed to estimate a joint probability density function (PDF) of a position, a velocity, an attitude, and a heading of a strapdown inertial navigation system that uses at least one low-performance inertial measurement unit (IMU), the method comprising: estimating an initial-heading error using a first filter error state; and estimating an accumulated heading-change error using a second filter error state; wherein the first error state is an independent and distinct error state from the second filter error state.

Example 10 includes the method of Example 9, wherein selecting an error-state vector with components for estimating the error in the initial-heading and the error in the accumulated heading-change since the startup comprises: defining the first filter error state and the second filter error state to directly correspond to navigation quantities explicitly computed in the inertial navigation system.

Example 11 includes the method of any of Examples 9-10, further comprising: initializing filter uncertainties by: assigning an initial-heading uncertainty level to a third component of an ϵ-vector; and assigning a value that is less than the initial-heading uncertainty level to a third component of a γ-vector.

Example 12 includes the method of Example 11, further comprising: initializing a heading component of an uncertainty estimate in an Earth-to-Local-Vertical transformation with an initial-heading uncertainty level; and initializing a heading component of an uncertainty estimate in a Body-to-Local-Vertical transformation with the initial accumulated heading-change uncertainty level, which is a value less than the initial-heading uncertainty level.

Example 13 includes the method of Example 12, further comprising: initializing a Local-Vertical frame so a wander angle is equal to the initial-heading angle; and initializing a heading component of the Body-to-Local-Vertical transformation with a value of zero.

Example 14 includes an inertial navigation system with mitigated heading inconsistency, the system comprising: at least one processor to execute algorithms in a strapdown navigation module and in a navigation filter to: estimate an initial-heading error using a state that is independent of an estimated error in an accumulated heading-change since a startup of at least one low-performance inertial measurement unit (IMU) in the inertial navigation system; estimate an initial-heading error using a first filter error state; estimate an accumulated heading-change error using a second filter error state; wherein the first error state is an independent and distinct error state from the second filter error state; and ensure the first error state and the second error state directly correspond to navigation quantities explicitly computed in the inertial navigation system; and the at least one low-performance IMU to input inertial measurement to the strapdown navigation module; at least one relative aiding sensor to input at least one measurement of navigation data to the navigation filter, wherein the at least one relative aiding sensor is unable to directly sense the initial-heading.

Example 15 includes the inertial navigation system of Example 14, wherein the strapdown navigation module includes: an initial-heading estimate module; and an accumulated heading-change module, wherein the strapdown navigation module is configured to input an initial heading and wherein the accumulated heading-change module is configured to initialize an accumulated heading-change estimate to zero at a startup of the at least one low-performance IMU.

Example 16 includes the inertial navigation system of any of Examples 14-15, wherein the navigation filter includes: a local-vertical frame in which an wander angle is initialized with an initial-heading angle.

Example 17 includes the inertial navigation system of any of Examples 14-16, wherein the navigation filter includes: an initial-heading uncertainty estimate module; an accumulated heading-change uncertainty estimate module; and a joint probability density function (PDF) module.

Example 18 includes the inertial navigation system of Example 17, wherein the navigation filter is configured to input an initial-heading uncertainty level, and wherein the accumulated heading-change uncertainty estimate module is configured to input an initial accumulated heading-change uncertainty level that is less than the initial-heading uncertainty level.

Example 19 includes the inertial navigation system of any of Examples 14-18, wherein the at least one processor to execute algorithms in the strapdown navigation module and the navigation filter is further configured to execute algorithms in the strapdown navigation module and the navigation filter to: initialize a heading component of an uncertainty estimate in an Earth-to-Local-Vertical transformation with an initial-heading uncertainty level; and initialize a heading component of an uncertainty estimate in a Body-to-Local-Vertical transformation with a value less than the initial-heading uncertainty level.

Example 20 includes the inertial navigation system of any of Examples 14-19, wherein the at least one processor to execute algorithms in the strapdown navigation module and the navigation filter is further configured to assign an initial-heading uncertainty level to a third component of an ϵ-vector; and assign a value that is less than the initial-heading uncertainty level to a third component of a γ-vector.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method of mitigating filter inconsistency in a heading estimate from a navigation filter designed to estimate a joint probability density function (PDF) of a position, a velocity, an attitude, and a heading of a strapdown inertial navigation system that uses at least one inertial measurement unit (IMU), the method comprising:
   estimating an initial-heading error using a first filter error state; and
   estimating an accumulated heading-change error using a second filter error state;
   wherein the first error state is an independent and distinct error state from the second filter error state.

2. The method of claim 1, wherein selecting an error-state vector with components for estimating the error in the initial-heading and the error in the accumulated heading-change since the startup comprises:
   defining the first filter error state and the second filter error state to directly correspond to navigation quantities explicitly computed in the inertial navigation system.

3. The method of claim 1, further comprising:
   initializing filter uncertainties by:
      assigning an initial-heading uncertainty level to a third component of an $\epsilon$-vector; and
   assigning a value that is less than the initial-heading uncertainty level to a third component of a $\gamma$-vector.

4. The method of claim 3, further comprising:
   initializing a heading component of an uncertainty estimate in an Earth-to-Local-Vertical transformation with an initial-heading uncertainty level; and
   initializing a heading component of an uncertainty estimate in a Body-to-Local-Vertical transformation with the initial accumulated heading-change uncertainty level, which is a value less than the initial-heading uncertainty level.

5. The method of claim 4, further comprising:
   initializing a Local-Vertical frame so a wander angle is equal to the initial-heading angle; and
   initializing a heading component of the Body-to-Local-Vertical transformation with a value of zero.

* * * * *